(12) United States Patent
Marra et al.

(10) Patent No.: US 6,484,085 B2
(45) Date of Patent: Nov. 19, 2002

(54) ENTERING AND EXITING ECP MODE FOR AN INTEGRATED ECP/EAB SYSTEM

(75) Inventors: Jon M. Marra, Henderson, NY (US); Dale R. Stevens, Adams Center, NY (US); James R. Truglio, Watertown, NY (US); John W. LaDuc, Harrisville, NY (US); Roger B. Lewis, Stem, NC (US); Kip P. Flint, Castorland, NY (US)

(73) Assignee: New York Air Brake Corporation, Watertown, NY (US)

( * ) Notice: Subject to any disclaimer, the term of this patent is extended or adjusted under 35 U.S.C. 154(b) by 6 days.

(21) Appl. No.: 09/824,883

(22) Filed: Apr. 4, 2001

(65) Prior Publication Data

US 2002/0147538 A1 Oct. 10, 2002

(51) Int. Cl.[7] ................................. B60T 13/58
(52) U.S. Cl. .............................. 701/70; 701/19; 701/20; 303/15; 303/20; 303/22.6; 246/182 B
(58) Field of Search .............................. 701/19, 20, 70; 303/3, 15, 20, 22.6; 246/182 B

(56) References Cited

U.S. PATENT DOCUMENTS

| | | | | |
|---|---|---|---|---|
| 4,652,057 A | | 3/1987 | Engle et al. | |
| 5,172,316 A | * | 12/1992 | Root et al. | 246/182 B |
| 5,249,125 A | * | 9/1993 | Root et al. | 246/182 B |
| 5,369,587 A | * | 11/1994 | Root et al. | 246/182 B |
| 5,412,572 A | * | 5/1995 | Root et al. | 246/182 B |
| 5,538,331 A | | 7/1996 | Kettle, Jr. | |
| 5,590,042 A | | 12/1996 | Allen, Jr. et al. | |
| 5,862,048 A | | 1/1999 | Knight | |
| 5,984,427 A | | 11/1999 | Kettle, Jr. | |
| 6,024,419 A | * | 2/2000 | Waldrop et al. | 303/15 |
| 6,098,006 A | * | 8/2000 | Sherwood et al. | 303/128 |
| 6,135,574 A | * | 10/2000 | Pettit et al. | 303/15 |

* cited by examiner

Primary Examiner—Michael J. Zanelli
Assistant Examiner—Eric M Gibson
(74) Attorney, Agent, or Firm—Barnes & Thornburg

(57) ABSTRACT

A method of transitioning between the pneumatic and electric modes of an integrated pneumatic/electro-pneumatic train brake system which includes a brake control having a common operator brake controller. Initially, the control applies the brakes in response to the operator brake controller in the present mode. The control enables the next mode upon request from the operator and applies the brakes in the next mode to match the applied brakes in the present mode. Once the present mode brake is released, the control and system switch to the next mode. Other brake controllers monitor the network and automatically switches modes based on the status of the network.

27 Claims, 13 Drawing Sheets

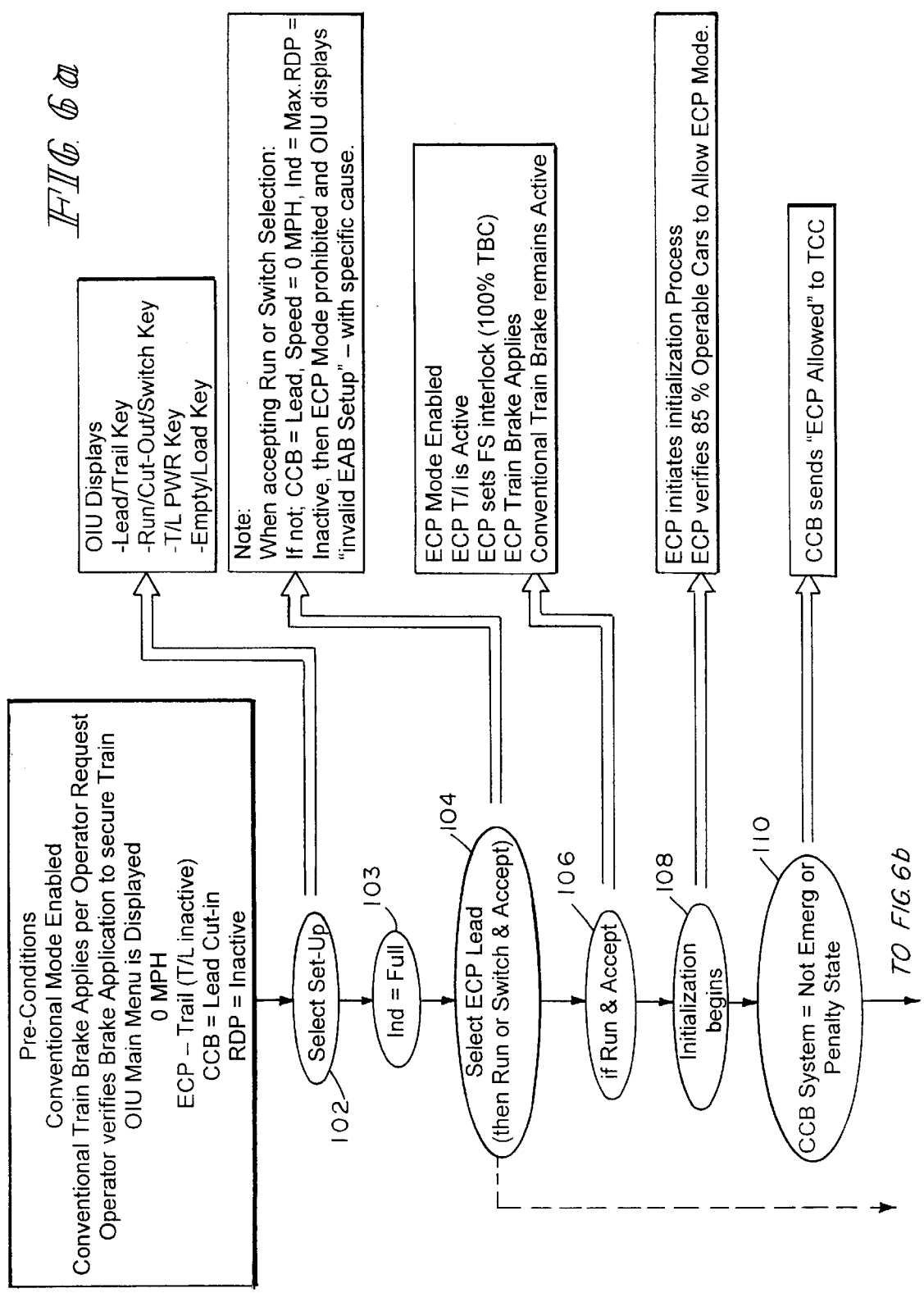

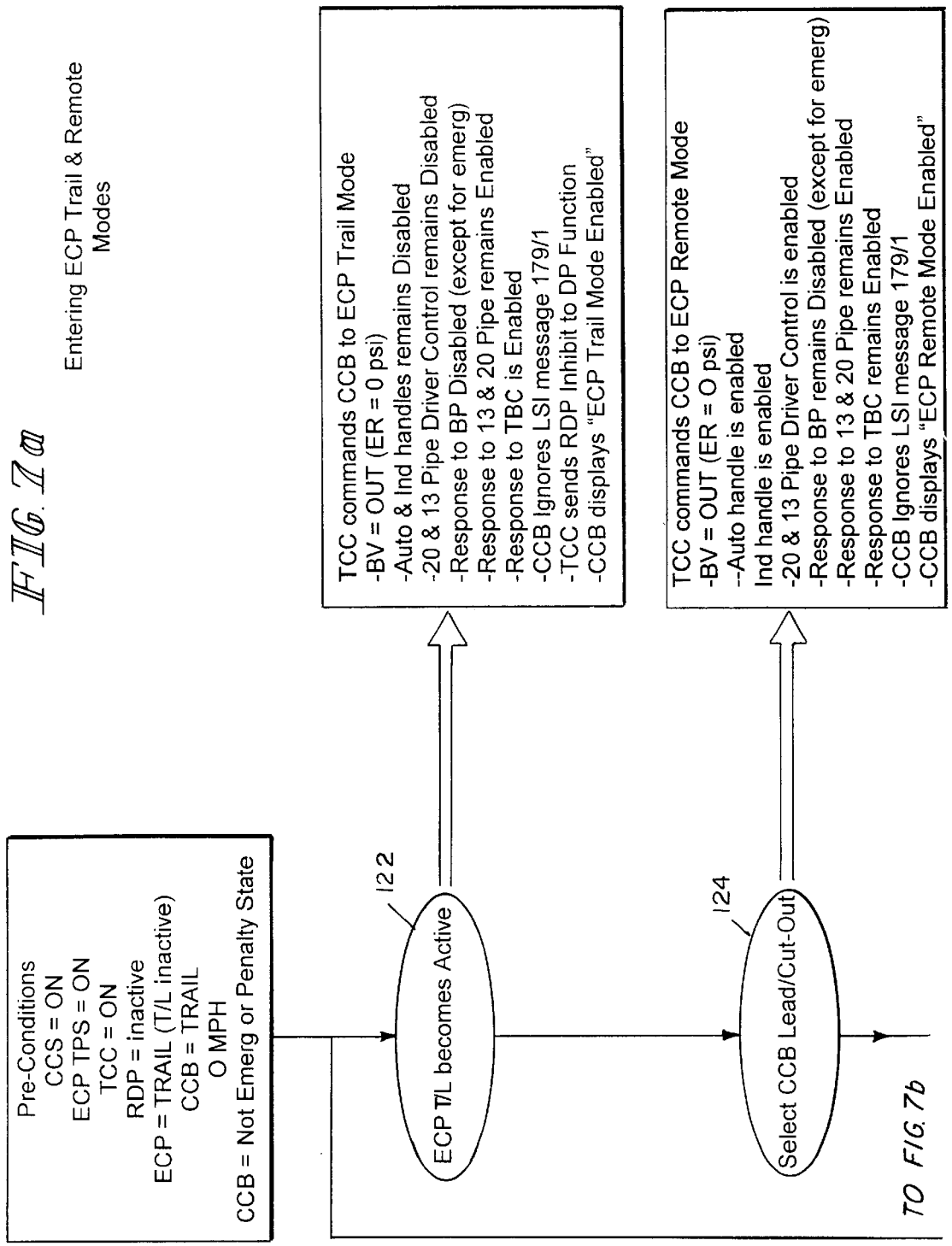

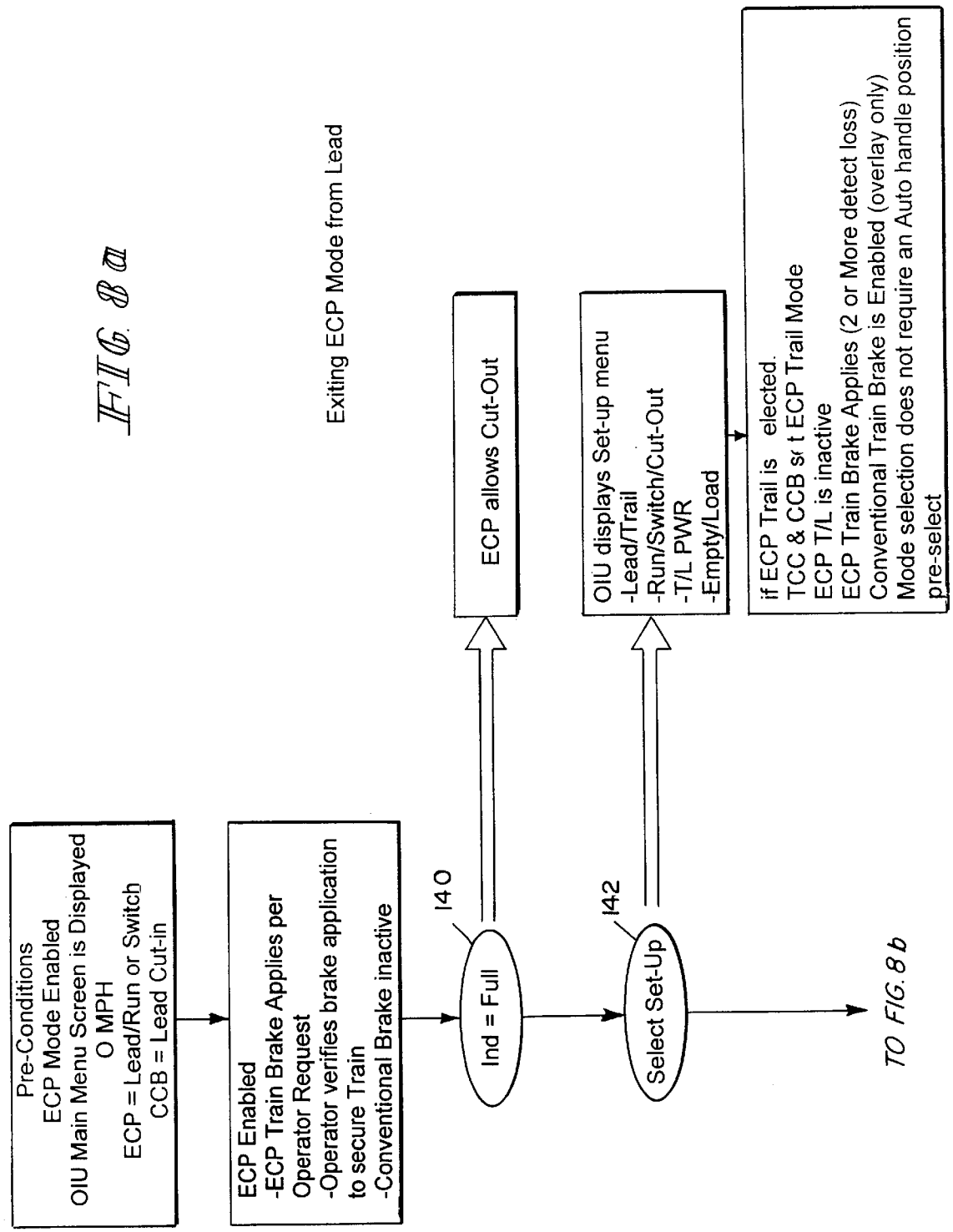

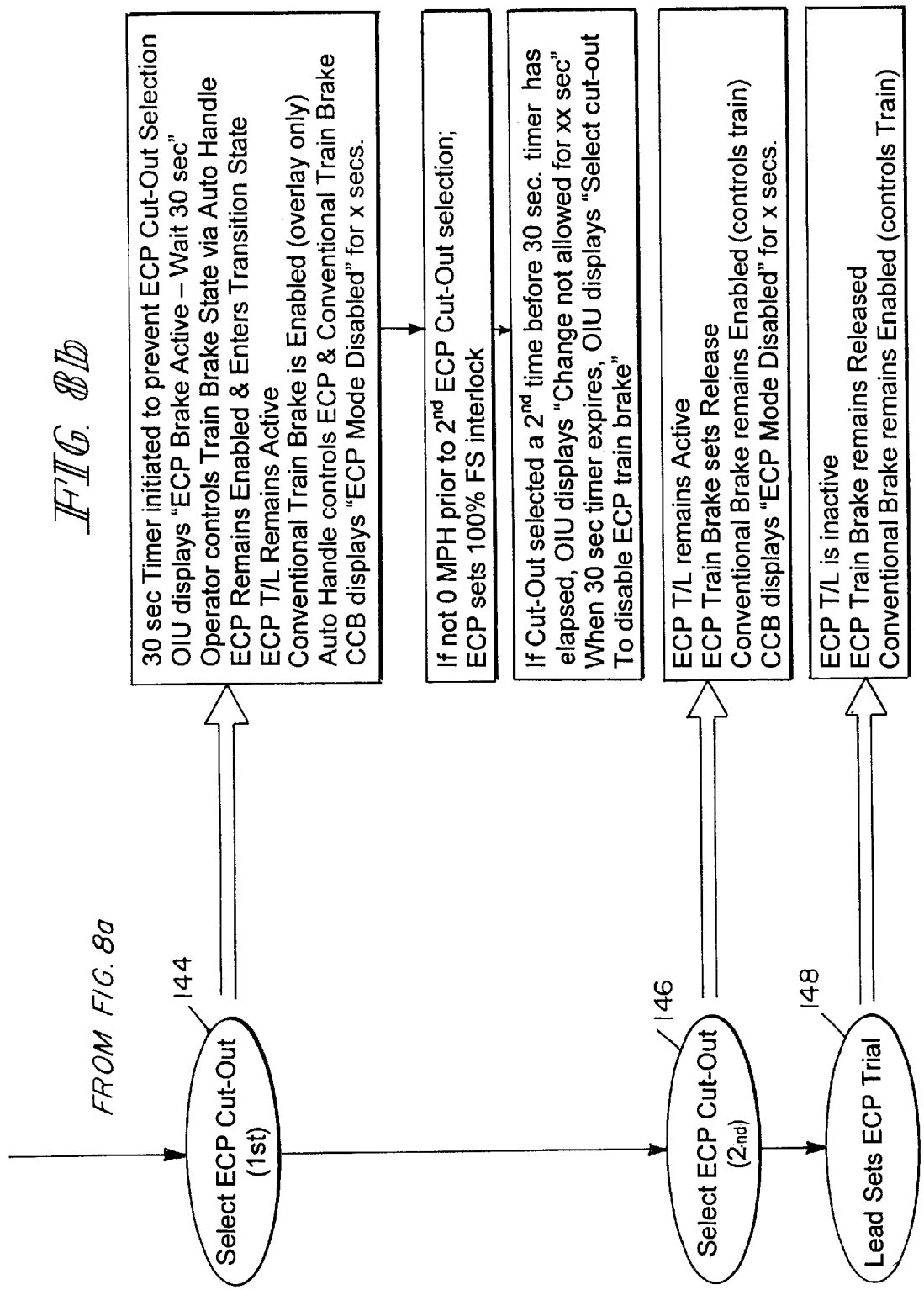

ENTERING AND EXITING ECP MODE FOR AN INTEGRATED ECP/EAB SYSTEM

BACKGROUND AND SUMMARY OF THE INVENTION

The present invention relates generally to electrically controlled pneumatic train brake and computer controlled train brake systems, and more specifically, to switching between pneumatic and electrical mode in integrated braking systems.

Computer controlled brake systems or EAB brake control systems are well known as exemplified by CCBI and CCBII available from New York Air Brake Corporation. These systems provide computer controls of the pneumatic control unit for the pneumatic pipes running throughout the train. This allows pneumatic control of the locomotive as well as the individual car brakes. More recently, the industry has been striving to provide electrically controlled pneumatic or electropneumatic brakes on each of the cars and locomotives. This has led to the electrically controlled pneumatic ECP system which is independent of the computer control braking system. An overview of such a system is EP-60 available from New York Air Brake Corporation.

As presently implemented, the ECP system in the locomotive runs in parallel to that of the conventional pneumatic locomotive train controls. Two brake valves are provided, one being the brake valve for the pneumatic braking and the other being the ECP brake valve. Similarly, separate displays are provided for each system. The locomotive or the consist of the locomotives do not respond to the brake commands made by the ECP system since the locomotives respond to pneumatic signals on pipes. Also, the ECP system has its own discrete input from the event recorder and from the locomotive controls to determine penalties.

With the implementation of electrically controlled pneumatic (ECP) or electro-pneumatic (EAB) brakes, there has been discussion of the desirability of integrating the computer controlled braking systems with the electrical controlled pneumatic (ECP) brake systems.

Integrating ECP and EAB brake control systems create mode transition requirements, where the control system must transition to and from the following:

Controlling a conventional pneumatic brake system (i.e. DB-60, etc.)

Controlling an electronic trainline brake system (i.e. EP-60, etc.

With non-integrated systems, the interaction is independent of each other for entering and exiting each system mode. The train engineer is provided a separate brake controller for each system, for the independent selection of a desired brake level for each system.

With the integrated system, each system relies on a common brake controller. Therefore during system transition (entering and exiting), where each system warrants opposing brake commands from a common controller, a special control process is required.

The present invention is a method of transitioning between the pneumatic and electric modes of an integrated pneumatic/electro-pneumatic train brake system which includes a brake control having a common operator brake controller. Initially, the control applies the brakes in response to the operator brake controller in the present mode. The control enables the next mode upon a request from an operator and applies the brakes in the next mode to at least the level equal to or greater than applied brakes in the present mode. Once the next mode is verified and the present mode brakes only are released, the control system switch to the next mode.

Wherein the present mode is the pneumatic mode and the next mode is the electric mode, the operator releases the pneumatic brakes by moving the brake controller to release which charges the brake pipe. The brake pipe remains charged in the electric mode. When the brake system is switched to the electric mode, a full service interlock is set. This interlock is released by moving the brake controller to full service position and subsequently back to release position. The electric mode will not be enabled if the speed of the train is more than zero. Similarly, the electric mode will not be enabled if the brake control is not in lead in the pneumatic mode and not in lead in the electric mode.

The brake system includes at least one other brake control in a network with the brake control. When the brake control is switched to the electric mode, the brake control activates the networks and the other brake control monitors the network and switches itself automatically to the electric mode upon detecting that the network is active.

If the other brake control is initially in trail in the pneumatic mode, the other brake control automatically switches to trail in the electric mode. If the other control is in the lead in the pneumatic mode, the other brake control switches to remote in the electric mode. If the other brake controllers change from lead to trail in the pneumatic mode, the other brake control automatically switches into trail in the electric mode. If the other brake control is changed from trail to lead in the pneumatic mode, the other brake control automatically switches into remote in the electric mode.

When the present mode is the electric mode and the next mode is the pneumatic mode, the brake control enables the pneumatic mode in response to a first electric mode cut-out request from the operator. The brake control releases the electro-pneumatic brakes after verification that the pneumatic mode is operational and upon a second cut-out request from the operator. During this transition, both systems are responding to a common brake controller. The brake. control does not release the electro-pneumatic brake if the second cut-out request occurs within a predetermined time period after the first cut-out request. If the train speed is more than zero any time before the second cut-out request, the electro-pneumatic brakes are set to a full service interlock. The pneumatic mode will not be enabled if the brake control is not in lead in the pneumatic mode. The brake control is changed to trail in the electric mode after the brake control has been switched to the pneumatic mode to de-activate the electro-pneumatic brake control and the trainline.

The brake system includes at least one other brake control in a network with the brake control. With a brake control switch to the pneumatic mode, the brake control sends a cut-out status on the network and the other brake control monitors the network and switches to the pneumatic mode upon detecting the cutout status on the network. The brake control is changed to trail in the electric mode after the brake controls has been switched to the pneumatic mode and the network becomes inactive. If the other brake control is in trail in the electric mode, the other brake control switches to the trail in the pneumatic mode. If the other brake control is in remote in the electric mode, the other brake control switches to lead/cut-out in the pneumatic mode.

The method is performed by software stored in the brake system.

Other objects, advantages and novel features of the present invention will become apparent from the following detailed description of the invention when considered in conjunction with the accompanying drawings.

BRIEF DESCRIPTION OF THE DRAWINGS

FIGS. 8a and b are is a flow chart of a method for switching from electric EPC mode in lead to a pneumatic mode in lead according to the principles of the present invention.

DETAILED DESCRIPTION OF THE PREFERRED EMBODIMENT

Although the present brake system will be described using EP-60 electro-pneumatic train brake system and CCBI/CCBII computer controlled locomotive brake system as an example of two systems which may be integrated, the present integrated system can be implemented using other similar pneumatic EAB and electro-pneumatic ECP systems for train and locomotive brake controls.

Figure 1:
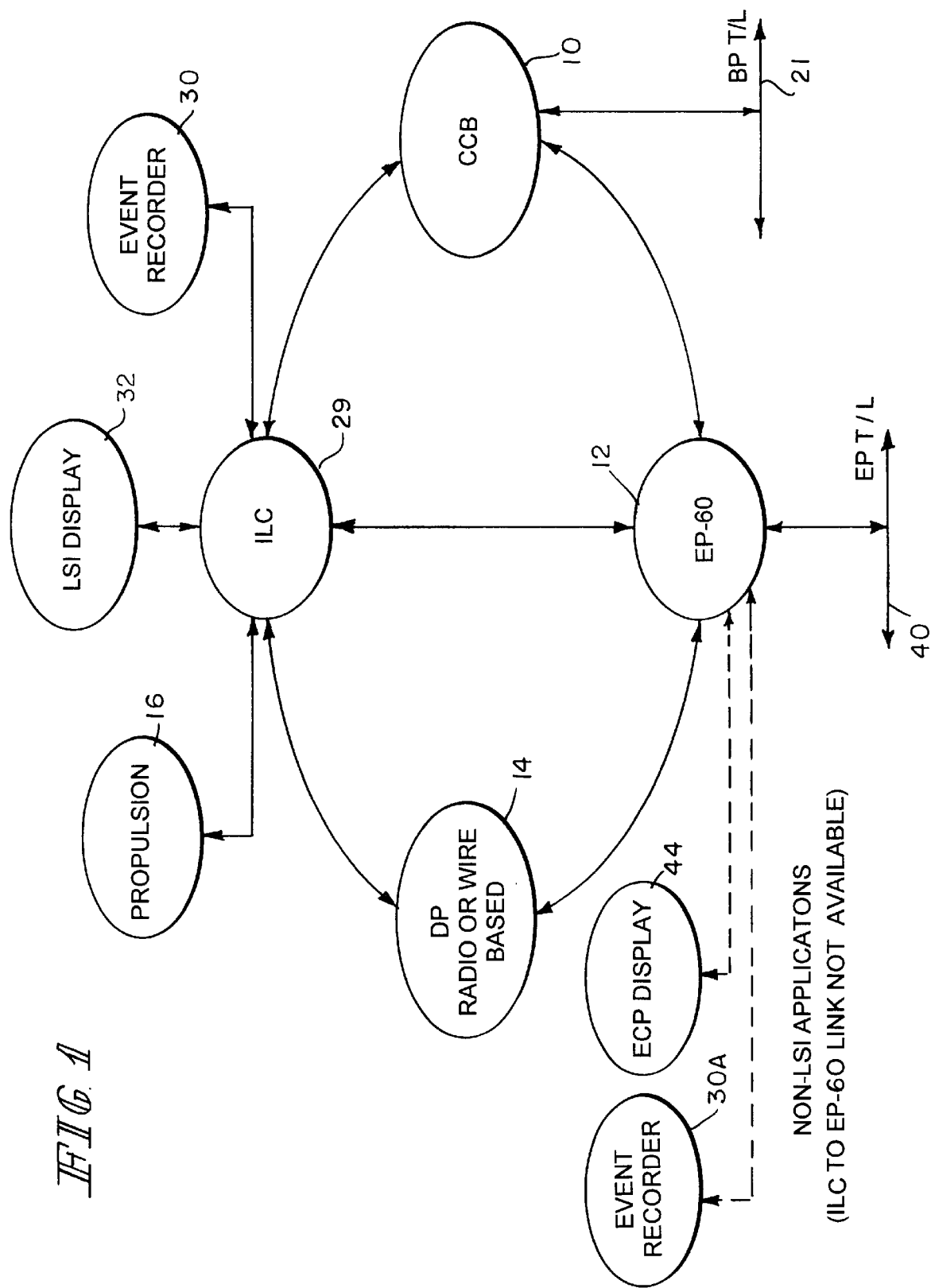
FIG. 1 is a diagram of the architecture of a typical integrated train electrical and pneumatic brake system for a locomotive system integration and non-locomotive system integration applications.

An overview of the system architecture is illustrated in FIG. 1. A computer controlled locomotive brake system 10 is illustrated as a CCB. It controls the brake pipe train line 21. It is connected to an electro-pneumatic train brake system 12, which is illustrated as an EP-60 and controls a electropneumatic trainline 40. An integrated locomotive computer (ILC) 29 is connected to the CCB 10 and the EP-60 12. A distributed power system DP 14 is also provided and connected to the ILC 29. The ILC 29 is also connected to a propulsion system 16 and transmits information to the event recorder 30. An integrated display 32 is also connected to the ILC 29.

For non-locomotive system integration applications, namely where the ILC 29 link to the EP-60 12 is not provided, an operator interface unit or ECP display 44 is provided and connected to the EP-60 and a separate event recorder 30A is connected to the EP-60. The event recorder 30 may be a separate and distinct device or integrated into the ILC 29. If it is a separate event recorder, it is the same event recorder as 30A.

Figure 2:
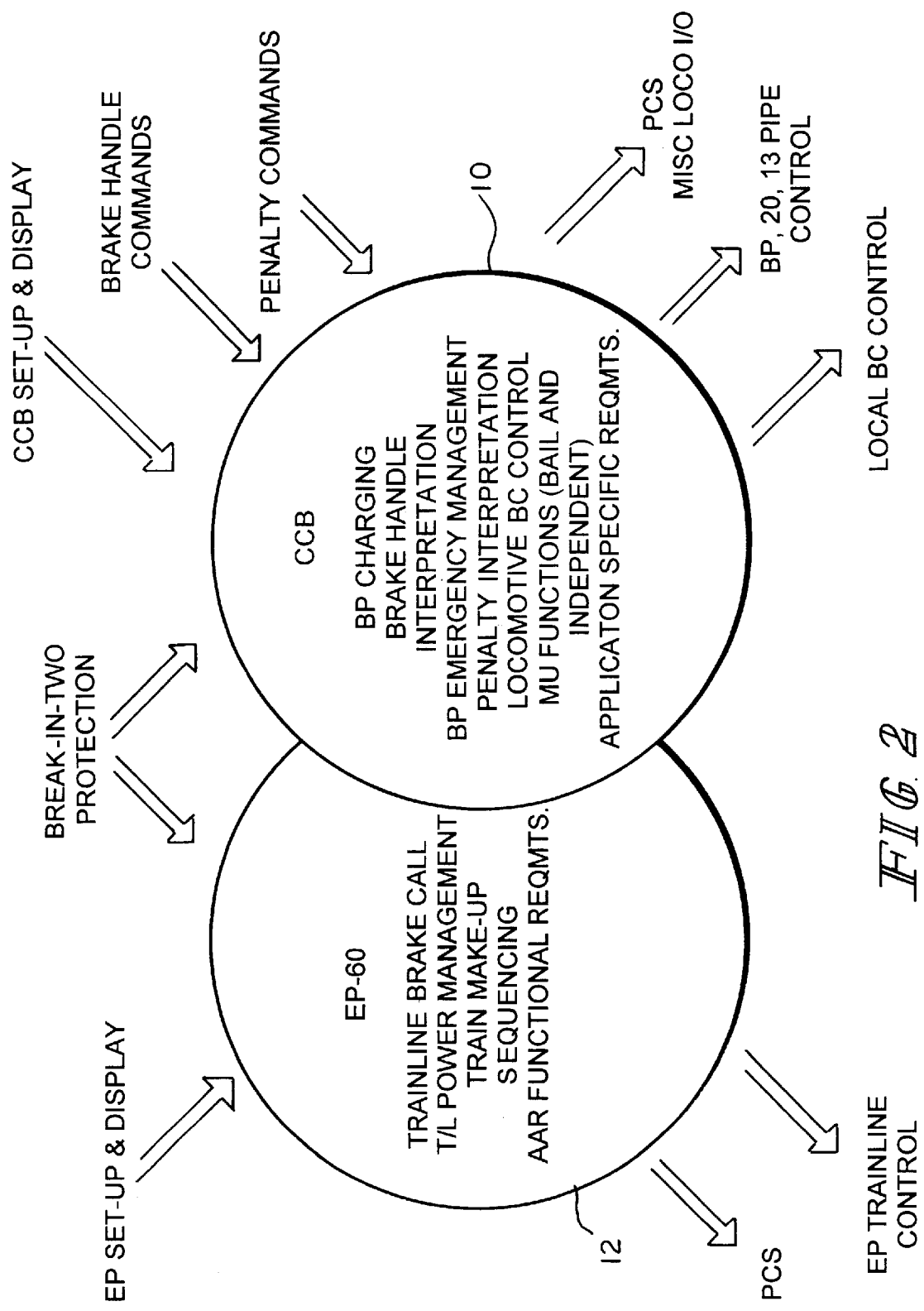
FIG. 2 is a diagram of system proportioning between the computer controlled brake system and an electro-pneumatic brake system.

The partitioning of the operation of the various operations performed by EP-60 and CCB is illustrated in FIG. 2. The EP-60 receives an ECP set up and display information. It provides outputs to the power cut-off switch PCS of the locomotive system as well as the ECP trainline control. The EP-60 is responsible for the ECP trainline brake call, trainline power management, train makeup and sequencing and other AAR functional requirements.

The CCB receives inputs from the CCB set up and display, brake handle commands and penalty commands. It provides outputs to the PCS and other miscellaneous locomotive input/outputs. It also controls the brake pipe, the 20 pipe and the 13 pipe as well as local brake cylinder controls. The CCB is responsible for brake pipe charging, brake handle interpretation, brake pipe emergency management, penalty interpretation, locomotive brake cylinder control, multi-unit operation function or MU functions (bail and independent), and application of locomotive specific requirements.

The interaction and the transfer of signals and control between EP-60 and the CCB will be explained with respect to a standard or pneumatic braking and electrical braking.

Figure 3:
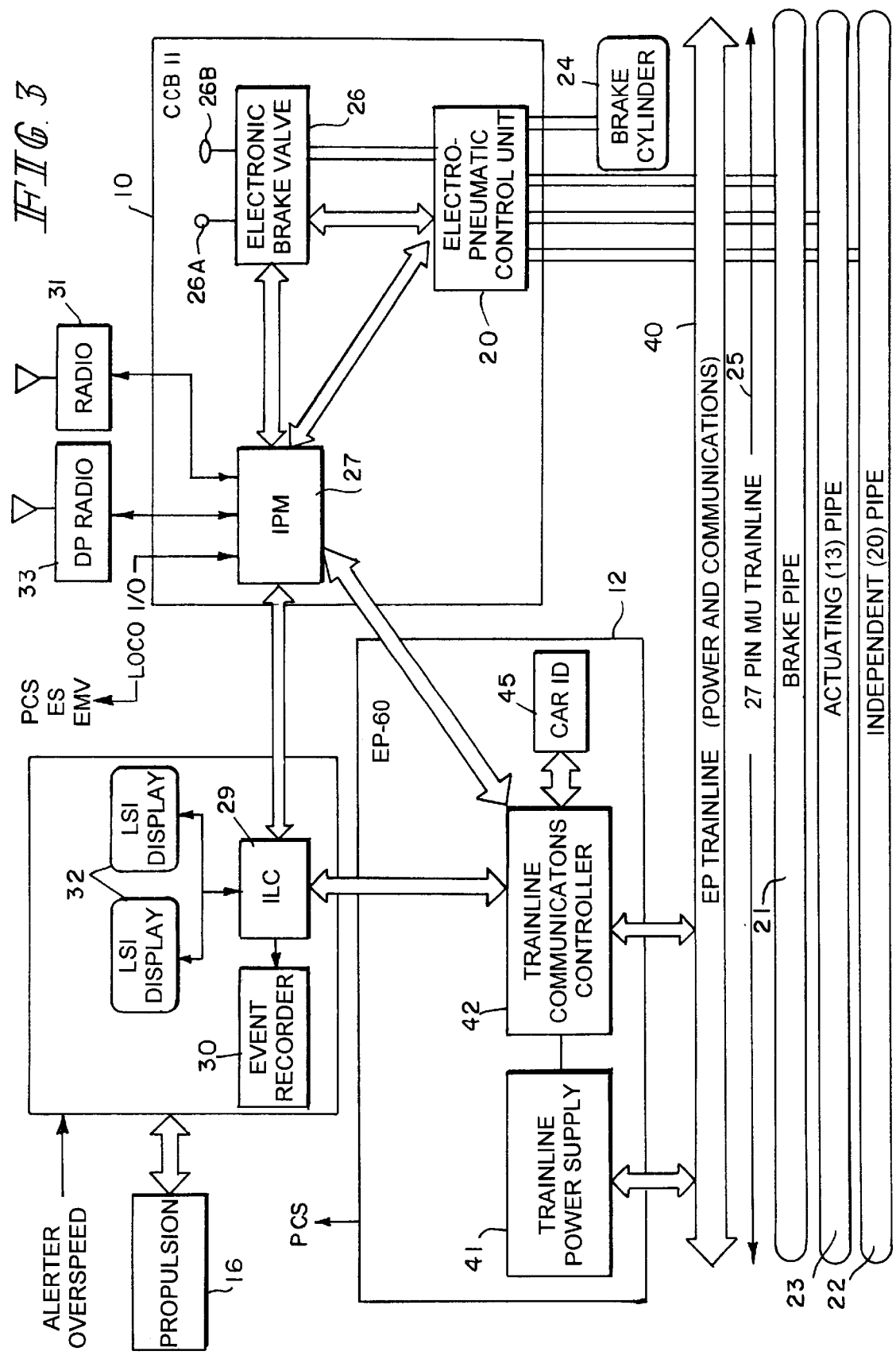
FIG. 3 is a block diagram of the integration of a computer controlled brake system and a first electro-pneumatic brake system for locomotive system integration application.

An example of a computer controlled locomotive brake system 10 in FIG. 3 includes an electro-pneumatic control unit (EPCU) 20 responsive to input signals to control the pressure on brake pipe 21, independent application and release pipe (#20) 22 and the actuating pipe (#13) 23 and the brake cylinders 24 on its locomotive. The independent application and release pipe 22 and the actuating pipe 23 run throughout the locomotive consist and allow independent control of the locomotive brakes as distinguished from the control of the pneumatic brakes in each of the car by the brake pipe 21 running throughout the train. Electrical communication and control of the locomotives in the consist is available over the 27-pin mu wire 25. This is generally under the control of the propulsion control system (not shown).

A computer controlled brake system 10 is shown, for example as a CCBII, and includes an integrated processor module IPM 27 which electrically controls the pneumatic control unit 20. The IPM 27 receives inputs from an electronic brake valve EBV 26 having an automatic brake handle 26A to control the train brakes via the brake pipe 21 and an independent brake handle 26B to control the locomotive brakes via independent pipe 22 and actuating pipe 23. The EBV 26 is an operator brake controller or interface. An integrated locomotive computer ILC 29 connects the IPM to an event recorder 30 and displays 32. The event recorder 30 may be a separate element or integral to the ILC 29. Penalties, for example Alerter and Overspeed are inputs to the ILC 29. The propulsion system 16 communicates with the ILC 29. The lead propulsion system communicates with other locomotives in its consist via MU trainline 25.

The IPM 27 is connected to other locomotive systems, not shown, and provides typical outputs, such as a power cut-off switch signal PCS, emergency sand signal ES and emergency magnetic valve EMV. The IPM 27 may be integrated with distributed power DP 14 and would communicate via radio module 33 to the other locomotives in the consist as well as distributed throughout the train. An end of train radio 31 communicates to the end of train device.

The connection between the IPM 27, the brake valve 26 and the electro-pneumatic control unit 20 is by a common bus. The suggested connection is a LonWorks bus wherein each of the modules is a node on the network. The connection between the IPM 27 and the ILC 29 is a standard serial link, for example, an RS422-HDLC. The system as described so far is well known and need not be described in further detail.

The controls of an electrically controlled pneumatic brake system ECP of the prior art is illustrated as EP-60 available from New York Air Brake Corporation as an example. The electrically controlled pneumatic brakes includes a trainline power supply TPS 41, which converts battery power from the locomotive to power for the ECP train line 40. This is an electric line that runs throughout the train and provides electrical power and communications to EP-60 brakes on each car and if available on locomotives. A trainline communication controller TCC 42 is connected to the ECP trainline 40 as a node on the trainline network. A car ID node 45 is shown as part of the EP-60 system. In the prior art, the TCC 42 has no control over the pneumatic brake lines 21, 22 and 23. It only controls communication, either providing or receiving information, via the ECP trainline 40. Thus, it can only communicate with other locomotives in the train which have ECP trainline controllers or ECP car nodes on the network and connected to the ECP trainline 40. Although the ECP trainline is shown as a line running through each car in the train, it is to be understood that the ECP network may be by radio or other non-wire connection.

As implemented in the prior art, the ECP brake system runs in parallel to that of the conventional pneumatic or computer control locomotive train controls. The two brake valves are provided, one being the pneumatic brake valve and the other being the ECP brake valve. Similarly, separate displays are provided. The locomotive or the consist of the locomotives do not respond to the brake commands made by the ECP locomotive system. Also, the ECP system has its own discrete input/output to the event recorder 30A and locomotive controls to determine penalties.

The integrating of the computer controlled braking systems 10 with the electrical controlled pneumatic brake system 12 is achieved by interconnecting these systems as nodes on a common network as shown. The integration results in having only a single brake control valve or operator interface, namely the CCB control valve 26, and eliminating the ECP control valve. Also, separate access to the event recorder 30, end of train device and a display for the TCC 42 is not required and is available from the computer control brake portion 10 in or directly from the ILC. Access to the penalties and other locomotive controls for the TCC 42 is also through the computer control brake system 10 or directly from the ILC. Finally, the ability of the locomotive brakes to be under the electronic controlled pneumatic system TCC 42 is provided.

As shown in FIG. 3, the ILC 29 is directly connected by, for example, an RS 422 HDLC serial communications link to the TCC 42 in locomotive system integration applications. This provides access to the event recorder 30 via the ILC 29. For non-integrated applications, the TCC 42 may have its own operator interface 44, not shown.

The train control signal from the brake valve 26 is provided to the IPM 27 and, depending upon whether the IPM 27 is in the pneumatic or the electric mode, either controls the electro-pneumatic control unit 20 for control of brake pipe 21, or provides the brake command signals to the TCC 42 which provides electrical train brake signals over the ECP trainline 40. The IPM 27 will not reduce the equalization reservoir (not shown) in response to the brake valve automatic handle movements in the ECP mode as it would in the pneumatic mode. This keeps the brake pipe 21 fully charged in the electrical mode.

All locomotives equipped with ECP will respond to the control signal on the ECP trainline 40 to apply its brakes in response to an ECP application. Simultaneously, the lead and any remote ECP equipped locomotive will apply the proportional pneumatic brake signal on the independent brake application and release pipe 22. The signal on this pipe will be monitored by the trailing locomotive units that do not have ECP capability and will apply the locomotive brakes accordingly.

A switch or set-up process will provide an indication to the IPM controller 27 whether it should be operating in the pneumatic or the electric control mode.

The IPM 27 in combination with the EBV 26 in FIG. 3 form a brake controller which provides locomotive and train brake commands. TCC 42 forms a first brake control connected to the brake controller 27,26 and transmits a car brake signal on the network or ECP trainline 40 for train brake commands. A second brake control, which includes electro-pneumatic control unit 20, is also connected to the brake controller 27,26 and transmits a locomotive brake signal on the locomotive brake pipe, which is independent pipe 22, for locomotive brake commands. For distributed power, the integrated locomotive computer 29 in combination with the IPM 27 interfaces to the propulsion system 16 and the locomotive systems with the brake system to transmit propulsion signals via TCC 42 to remote locomotives. The applying and release of the locomotive brakes using the independent pipe 22 can be achieved as well as bail-off without using the actuating pipe 23 or brake pipe 21. Thus, the actuating pipe 23 may be deleted.

Figure 4:
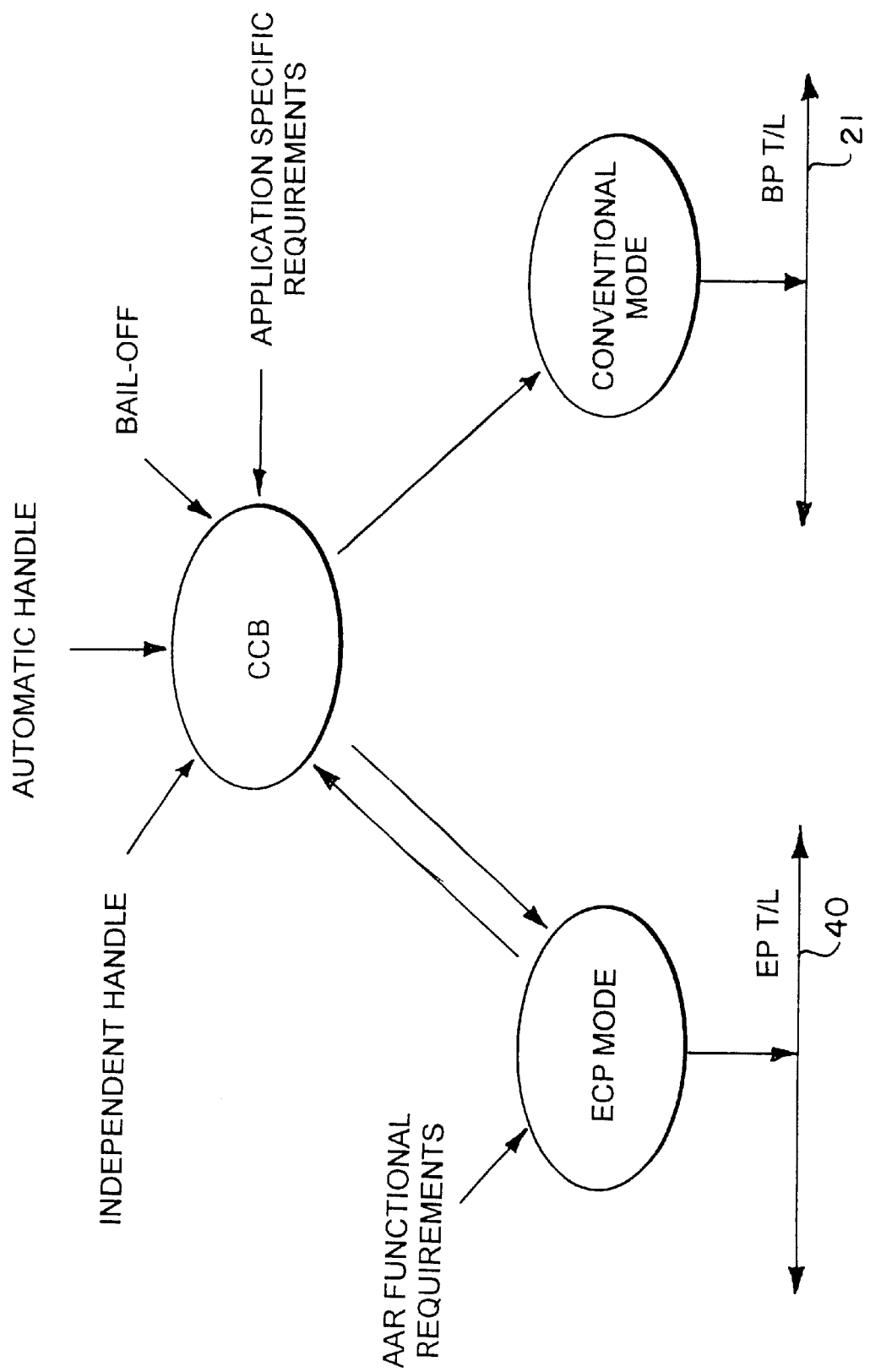
FIG. 4 is a block diagram illustrating brake valve control of the integrated system.

An overall view of the brake valve control is illustrated in FIG. 4. The EBV 26 provides an automatic handle, independent handle and bail-off inputs to the CCB which also executes application specific requirements for the locomotive. In a conventional or pneumatic mode, it controls the electro-pneumatic control unit 20 to control the brake pipe 21. In the electric mode, there is communication between the EP-60 12 and the CCB 10 which controls the ECP trainline 40.

In the electric mode, the actuation of the automatic handle 26A is processed by the IPM 27 and provides train brake signals to TCC 42. TCC 42 then provides an electrical train braking signal on the ECP trainline 40. It also provides back to IPM its electrical train signal, and the IPM 27 in turn provides braking commands to the electro-pneumatic control unit 20. The electro-pneumatic control unit 20 then provides an appropriate brake cylinder pressure for the brake cylinder 24 of that locomotive. The TCC's 42 on other remote locomotives provide the received train braking commands to their IPM's 27 which controls its electro-pneumatic control unit 20 to apply its brakes or brake cylinder 24.

The TCC 42 also, through IPM 27, commands the electro-pneumatic control unit 20 to apply a braking signal to the independent pipe 22. This allows pneumatic actuation of the trailing locomotive brakes allowing the locomotive consist to have non-ECP equipped trailing locomotives or the trail ECP locomotives could have their electric mode cut-out or disabled. Thus, in the electric mode, the brake cylinder control function of the electro-pneumatic control unit 20 is controlled by the TCC 42 and not by the EBV 26.

Since the independent pipe 22 is used to provide pneumatic signals to trail locomotives even in the electric mode, accommodations must also be made for the operation of the independent handle 26B in the electric mode. If the independent brake handle 26B is operated in the electric mode, the EBV 26 provides a signal to the TCC through IPM 27. The TCC 42 then provides a command back through IPM 27 to the electro-pneumatic control unit 20 to apply a pneumatic brake signal on the independent pipe 22. If the ECP trainline 40 and the TCC 42 have the capabilities, they provide a locomotive braking signal to other ECP equipped locomotives connected to the ECP trainline 40. If the automatic handle 26A and the independent handle 26B are both braking at the same time, the more restrictive braking command is used to control the locomotive brakes.

Similarly, distributed power signals can be sent on the ECP trainline 40 addressed to the remote locomotives in both the pneumatic and electrical modes. This would include distributed power commands, status and exceptions signals.

As previously discussed, the brake controller 27,26 has a pneumatic mode and an electric mode. The default mode for power up and certain types of failure is the pneumatic mode. In order to be switched over to the electrical mode, it must be selected as a lead locomotive and then switched over to the electric mode. In the electric mode, the brake controller 27,26 provides trainline brake signals on trainline 40 for the cars and locomotives that have ECP brakes and are connected to the trainline 40. In the pneumatic mode, the brake controller 27,26 provides the train or car brake signals on the brake pipe 21. For both the electric and pneumatic modes, the control unit 20 provides locomotive braking signals on the locomotive brake pipe or independent brake pipe 22.

Figure 5:
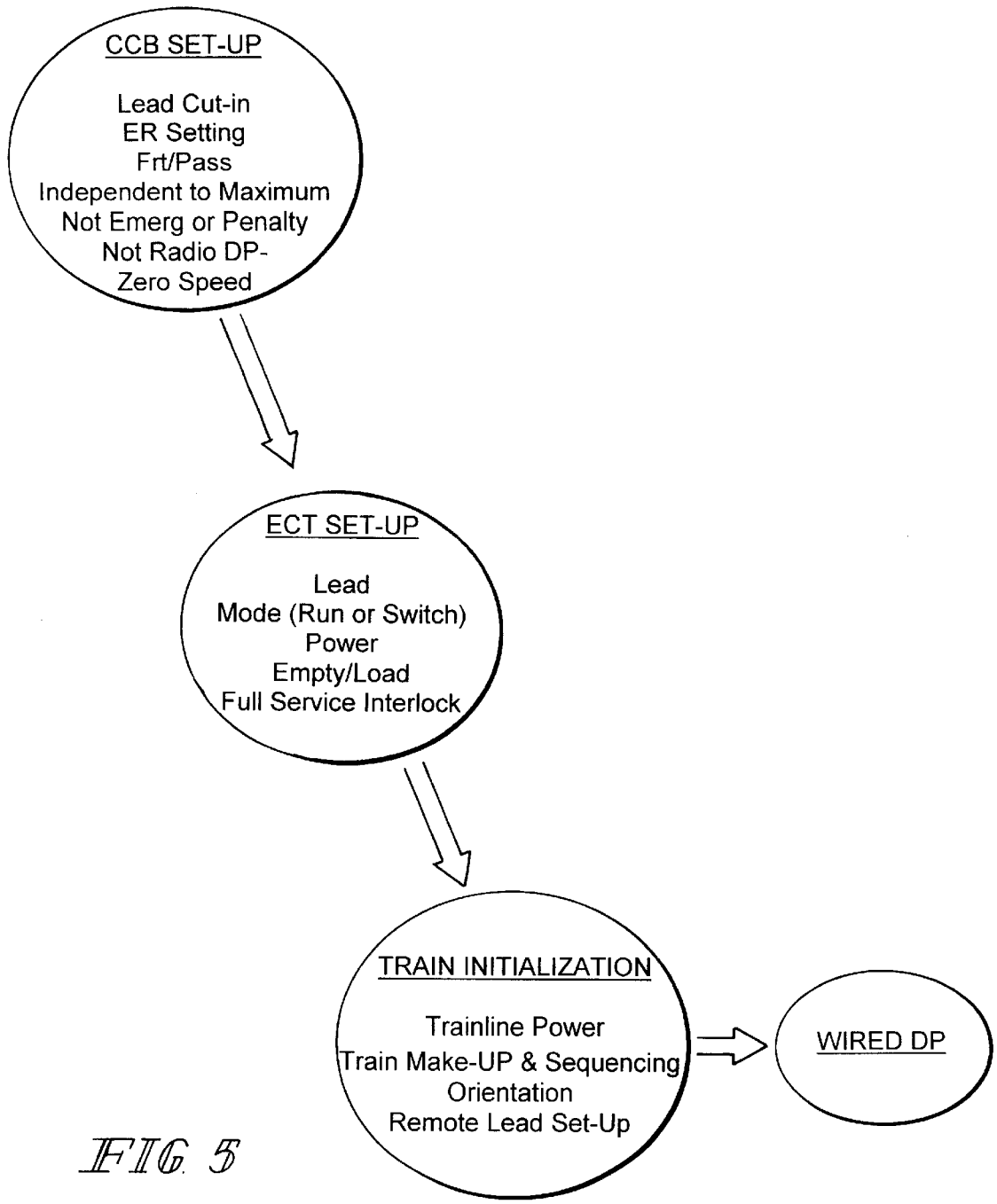
FIG. 5 is a diagram of the electric lead mode set up of the integrated system.
Figure 6B:
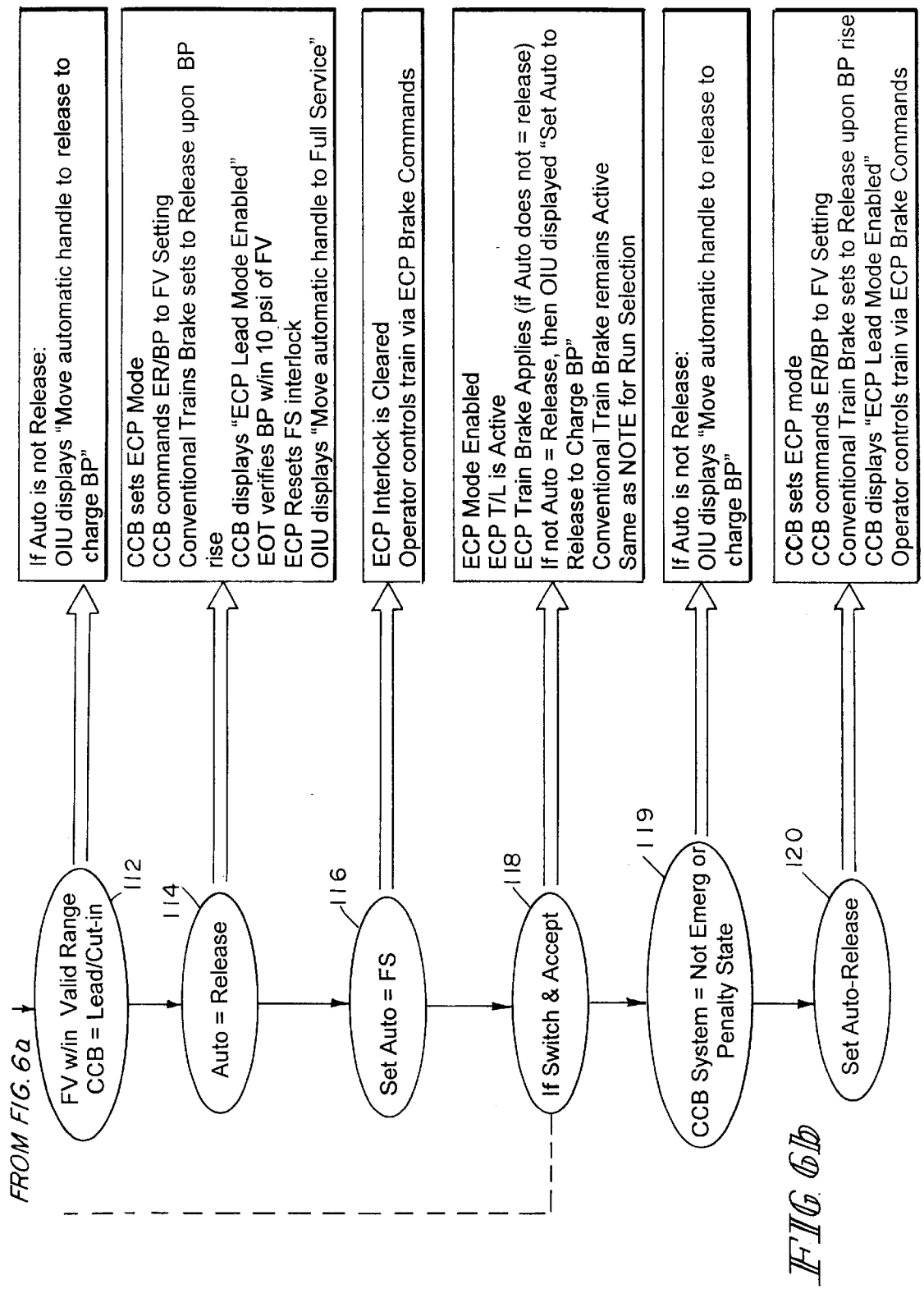
FIGS. 6a and b are a flow chart of the process for switching to electric ECP mode from pneumatic CCB mode in lead according to the principles of the present invention.
Figure 7B:
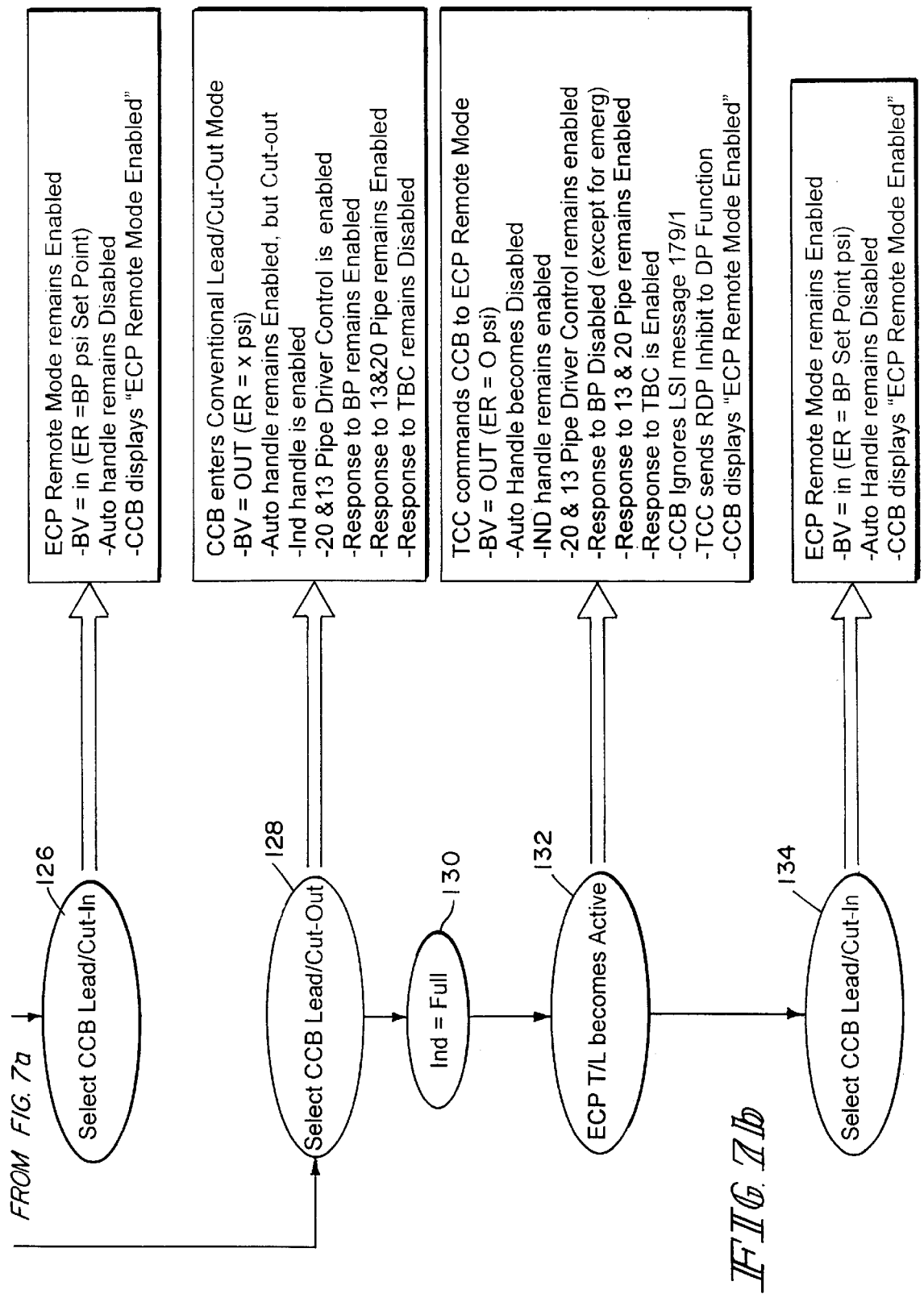
FIGS. 7a and b are a flow chart of a method of switching to electric mode in trail and remote from pneumatic mode according to the principles of the present invention.

The initial electric mode set up procedure is illustrated in FIG. 5. The CCB set up includes a lead and equalization reservoir setting. The system is set for freight or passenger. The independent handle is set to maximum. The radio DP is off and the speed is set to zero.

Once these activities are complete, the CCB system will now allow transition from conventional mode to EP mode. From this point, the ECP system can now be initialized per the standard ECP procedures. Menu selection and set-up options will be provided from the ILC LSI display. For applications when the ILC to ECP interface is not available, the separately provided ECP display will provide the same.

The ECP set-up includes entering the locomotive mode, system, mode, trainline power state and the train empty/load state all of which occurs while a full service brake interlock is applied to the train. The locomotive mode is set to lead, the system mode is set to run or switch, the trainline power is set to automatic (on) and the empty-load is set according to the load of the train.

When the ECP locomotive system set-up is complete, the ECP train set-up initialization process can then be preformed. This consists of establishing trainline power, establishing or confirming the identity of all trainline devices (locomotives or cars) as well as the position and orientation of all ECP equipped locomotives and cars. It also includes assignment of unique network addresses, collection of device information and downloading configuration information. During the initialization process, the Full Service Interlock is present until ECP confirms that all equipment is 100% operative. After all these conditions are met, the automatic brake handle must be moved to the full service position to reset the full service interlock. After which time, the ECP brake is now fully enabled and the brake can be released by moving the automatic handle to the release position.

Once ECP has been enabled, Wired Distributed Power can now be selected and the lead and remote locomotive setup can be performed. All remote locomotive set-up procedures are completed from the lead locomotive. Although the feature is provided, it will not be required to go to remote locomotives for set-up purposes, as is presently required for Radio Distributed Power.

The switching between the pneumatic CCB mode and the electric ECP mode will be described in detail. FIGS. 6a, 6b, 7a and 7b describe the sequence for switching from a pneumatic CCB to an electric ECP mode for a lead and trail or remote brake controls in the locomotives respectively. Switching from electric ECP to pneumatic CCB modes for a lead and trail or remote brake controls are described in FIGS. 8a, 8b, 9a and 9b, respectively.

Switching from the pneumatic CCB mode to the ECP electric mode includes entering ECP mode from lead. Prior to entering ECP mode, the train engineer sets a conventional pneumatic train brake by reducing brake pipe to desired level via the common controller. The pneumatic train brakes are applied to secure the train as desired by the engineer. When the ECP set-up process is entered, an automated ECP train brake command is initiated to apply the ECP train brake in parallel to the pneumatic brakes. Following completion of ECP set-up, the engineer is then allowed to release the pneumatic train brake via the common controller by moving the brake controller to release position to charge brake pipe, while the ECP train brake command remains applied. When the pneumatic train brake is released (brake pipe pressure fully charged), the engineer is allowed to release the ECP train brake command. The ECP train brake is now active and functioning to control the train brake. The conventional pneumatic train brake is continuously set to release.

In FIGS. 6a and b, the preconditions are that the convention or pneumatic mode has been enabled and the conventional train brakes have been applied per an operator request. The operator verifies that the pneumatic brake application secures the train. The operator interface unit OIU 32 menu is displayed. Additionally, the speed is zero, the ECP is in trail, and the trainline is inactive, the CCB is in lead cut-in and the radio distributive power RDP is inactive. The operator via the operator interface selects set up at 102. This produces an OIU display of the lead/trail key; the run/cut-out/switch key; the trainline power key and the empty/load key. To change ECP modes, the independent handle must be set to the Full (maximum applied) position at 103. The operator then selects the ECP lead at 104 and one of Run or Switch and Accept. If Run or Switch is selected, the CCB system must be in lead, the speed must be zero miles per hour, the independent brake must be max, and the radio distributive power must be inactive. If not, the ECP mode switch is prohibited and the OIU displays "Invalid EAB set up."

If Run and Accept is selected at 106, after selecting lead at 104, the ECP electric mode is enabled, the ECP trainline is activated. The ECP sets the full service interlock at 100% of train brake command and the ECP train brakes are applied. The conventional or pneumatic train brakes remain active. The operator then selects Make-up at 108 and the ECP initiates the Initialization process, which was described earlier. The ECP system then verifies that 85% of the operable cars are operating to allow the ECP mode. If the CCB system 10 determines that there is not an emergency or penalty state at 110, then the CCB sends an ECP allowed to the TCC 42.

The ECP system then confirms that the CCB feed valve setting is within a valid range and the brake valve is set to lead/cut-in 112. If the automatic handle is not in release, the OIU displays "Move automatic handle to release to charge BP." Once the automatic handle is set to release at 114, the CCB 10 sets the ECP mode and commands the equalizing reservoir ER and brake pipe BP to feed valve settings. The pneumatic train brakes release upon the brake pipe rise. The CCB drives the display 32 to display "ECP Lead mode enabled". The end of train device, EOT, verifies that the brake pipe is within 10 psi of a feed valve. The EPC system 12 resets the full service interlock and the OIU 32 displays "Move automatic handle to Full Service". The operator then moves the automatic handle to full service at 116. The ECP interlock is cleared and the operator controls the train by the ECP brake commands.

If Switch and Accept is selected at 118 after selecting lead at 104, the ECP mode is enabled and the ECP trainline 40 is activated. The ECP train brake is applied if the automatic handle is not in release. If the automatic handle is not in release, then the OIU 32 displays "Set auto to release to charge BP". The pneumatic train brakes remain activated and the switch conditions discussed with respect to the selected EPC lead of 104 are also applicable with respect to the preconditions of switching. If the CCB system determines that there is not an emergency or penalty state at 119, then the CCB sends an ECP allowed to the TCC 42. The operator then sets the automatic handle to release at 120. The CCB 10 then sets the ECP mode and commands the equalizing reservoir ER and brake pipe BP to feed valve settings. The pneumatic train brakes are set to release upon brake pipe rise. The CCB drives the display 32 to display "ECP Lead mode enabled" and the operator controls the train by the ECP brake commands.

As shown in FIGS. 7a and b, all the other brake controls and the locomotives automatically transition from the pneumatic mode to the EPC electric mode by monitoring and identifying when the trainline 40 becomes active and ECP commands are initiated. If the other brake controls in the train are in trail in the pneumatic mode, they switch to trail in the electric mode. If the other brake controls in the train are in lead in the pneumatic mode, the other brake controller switch to remote in the electric mode. This is lead cut-in and lead cutout. As was noted, this is accomplished without the need of the train crew to manually set up these other locomotives for ECP operation or mode.

As illustrated in FIGS. 7a and b, the preconditions are that the CCB system is on, that the electric ECP train power supply 41 is on and that the TCC 42 is on. The radio distributed power RDP is inactive and the electric mode is in trail with the ECP trainline 40 inactive. The pneumatic mode may be in trail or lead. Also, the speed should be zero and there should not be a pneumatic emergency or penalty state. When the ECP trainline 40 becomes active at 122 from the lead ECP, the local TCC 42 commands the CCB 10 to ECP mode in trail. The brake valve BV is set out and the equalizing reservoir ER is set to zero psi. The automatic and independent handles remain disabled as do the 20 and 13 pipe drivers controls. Response to the brake pipe is disabled except for emergency and the response to the 13 and 20 pipes remain enabled. Response to the train brake command TBC is enabled. The local TCC 42 sends radio distributed power inhibited to the distributed power function. At this point, the system has automatically established itself in ECP trail mode, ready for ECP trail operation with no further inputs. The CCB system drives the display 32 to display "ECP trail mode enabled".

The system then provides the option to operate the ECP trial locomotive in ECP remote mode. The operator is allowed to select CCB lead/cut-out at 124. The TCC 42 commands the CCB 10 to ECP mode remote. The brake valve is again set to out. The automatic handle remains disabled, but the independent handle is enabled. The 13 and 20 pipe driver controller is enabled. The response to brake pipe remains disabled except for emergency and the response to the 13 and 20 pipe remains enabled, as is response to the trainline brake commands. The operator may then select CCB lead/cut-in at 126. The EPC electric mode in remote remains enabled. The brake valve BV is then set to in with the equalizing reservoir ER set to the brake pipe pressure set point. This provides the ability to have an ECP remote mode locomotive assist the ECP lead mode locomotive to charge and maintain the brake pipe. In ECP remote mode, automatic handle remains disabled. Thus, the control is now in the ECP electric mode remote and the CCB drives the display 32 to display "ECP remote mode enabled".

If the system selects the CCB lead/cut-out at 128 prior to activating the ECP trainline at 122, the CCB 10 then enters conventional or pneumatic mode lead/cut-out. The brake valve is set to out. The automatic handle remains enabled but cut-out and the independent handle is enabled. The 13 and 20 pipe driver control is enabled. Response to the brake pipe remains enabled. The response to electric trainline brake commands remains disabled. Next, the independent is set to full at 130.

Then the ECP trainline becomes active at 132. The automatic handle becomes disabled while the independent handle becomes enabled. Similarly, the 20 and 13 pipe driver control remains enabled. The response to brake pipe is disabled except for emergency and the response to 13 and 20 pipe remain enabled. The response to the train brake commands becomes enabled. The TCC 42 sends radio DP inhibit to the distributed power function and the CCB displays "ECP Remote Mode Enable". Again, the system provides the option to the operator to assist in the charging of brake pipe by selecting CCB lead/cut-in at 134. The ECP remote mode remains enabled, the brake valve is set to in and the equalizing reservoir is set to brake pipe set point pressure and the automatic handle remains disabled.

Switching from the ECP electric mode to the pneumatic CCB mode, will now be described with respect to FIGS. 8a and b for a lead locomotive and FIGS. 9a and b for a trailer remote and locomotive.

Prior to exiting ECP mode, the train engineer set ECP train brake by commanding a desired electronic brake command via the common controller 26. The ECP brake is applied to secure the train as desired by the engineer. The train engineer then requests to exit the ECP mode by selecting cut-out. The pneumatic train brakes apply by reducing brake pipe to a level equivalent to and in parallel with that of the previously commanded electronic train brake. At this time, both the ECP train brake and the conventional pneumatic train brake are actively controlling their respective train brake controls per the engineer's request. The ECP system prompts the engineer after the pneumatic train brake is achieved to select cut-out a second time. In so doing, the ECP train brake is set to release, while still maintaining the desired pneumatic train brake command. When the ECP train brake is active and released, the engineer is allowed to control the train brake by the conventional pneumatic brake system.

Referring again to FIGS. 8a and b, the preconditions of the ECP electric mode is enabled and the OIU 32 main screen is displayed. The train is at zero speed. The ECP is set in lead Run or Switch and the CCB is set to lead cut-in. This is the lead pneumatic control. Next, the ECP train brakes are applied per operator request and the operator verifies that the brake application has secured the train. The conventional or pneumatic CCB brakes are inactive. Next, the operator sets the independent to full at 140. The ECP system 12 then allows cut-out.

Next, set-up is selected by the operator at 142. The OIU 32 displays the set-up menu, which includes lead/trail, run/switch/cut-out, trainline power and empty/load.

The operator selects cut-out for the first time at 144. A 30 second timer is initiated to prevent ECP cut-out selection for a period of 30 seconds. The operator interface 32 displays "ECP Brake Active-Wait 30 sec". The CCB system drives the display 32 to display "ECP Mode Disabled". The operator controls the train brake state via the automatic handle. The ECP 12 remains enabled and enters transitions state and the ECP trainline 40 remains active. The pneumatic train brake is enabled (for trains equipped with overlay type systems only. The automatic handle controls the ECP 12 and the pneumatic CCB 10 train brakes simultaneously. If the train is not at zero speed any time prior to the second ECP cut-out selection, the ECP sets a 100% full service interlock. If the cut-out is selected a second time before the 30 second timer elapses, the IOU 32 displays "Change not allowed for XX seconds." When the 30 second timer expires, the OIU 32 displays "Select cut-out to disable ECP train brake."

Once the operator selects ECP cut-out a second time at 146, the ECP trainline 40 remains active and the ECP 12 sets the train brakes to release. The pneumatic brakes remain enabled. The CCB drives the display 32 to display "ECP mode disabled." Finally, the system sets the ECP to trail at 148. The ECP trainline 40 becomes inactive. The ECP brakes are applied and released and the pneumatic brakes remain enabled under train control.

Figure 9A:
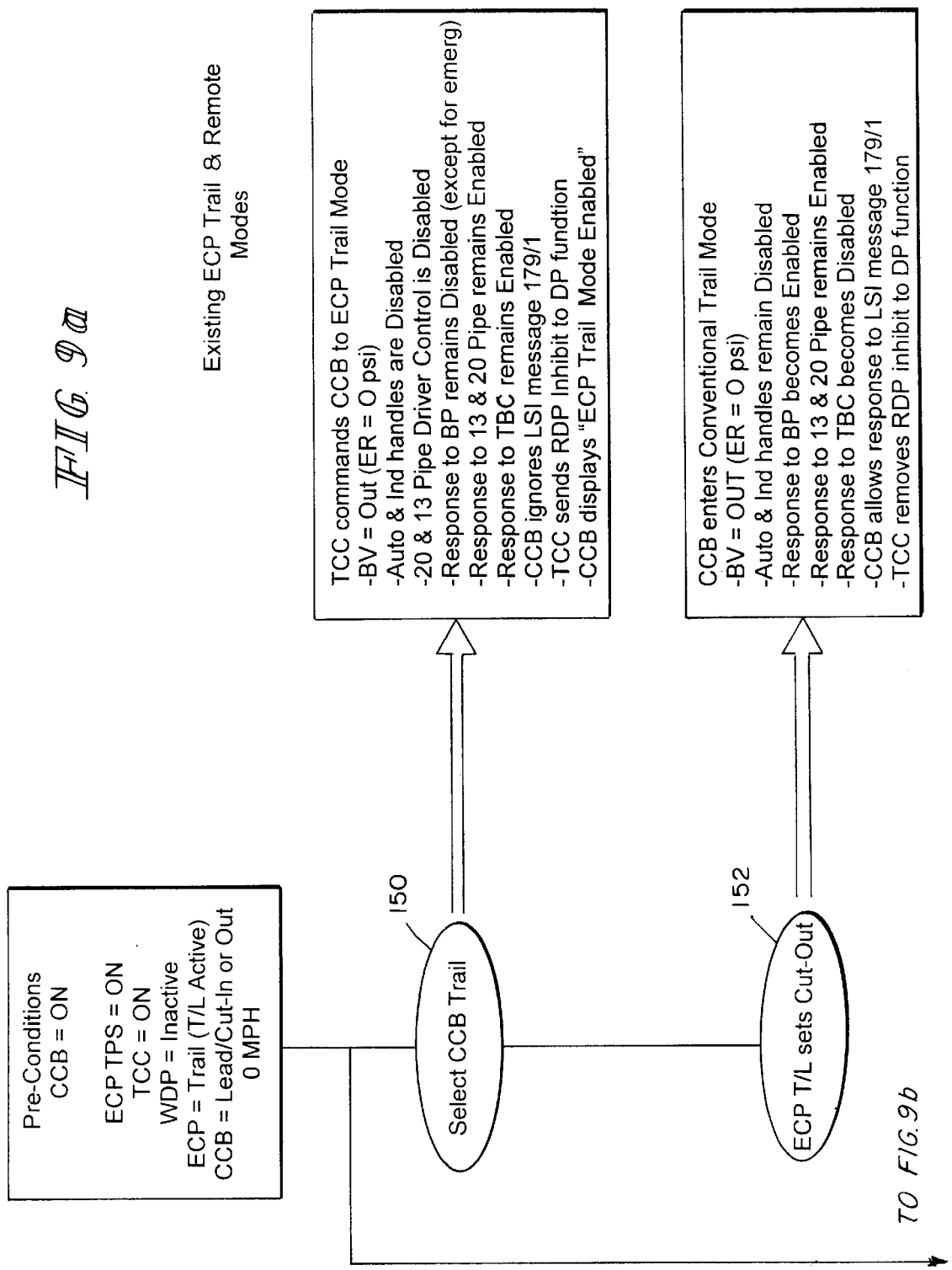
FIGS. 9a and b are a flow chart of a method of switching from electric ECP mode in trail and remote to pneumatic mode in trail according to the principles of the present invention
Figure 9B:
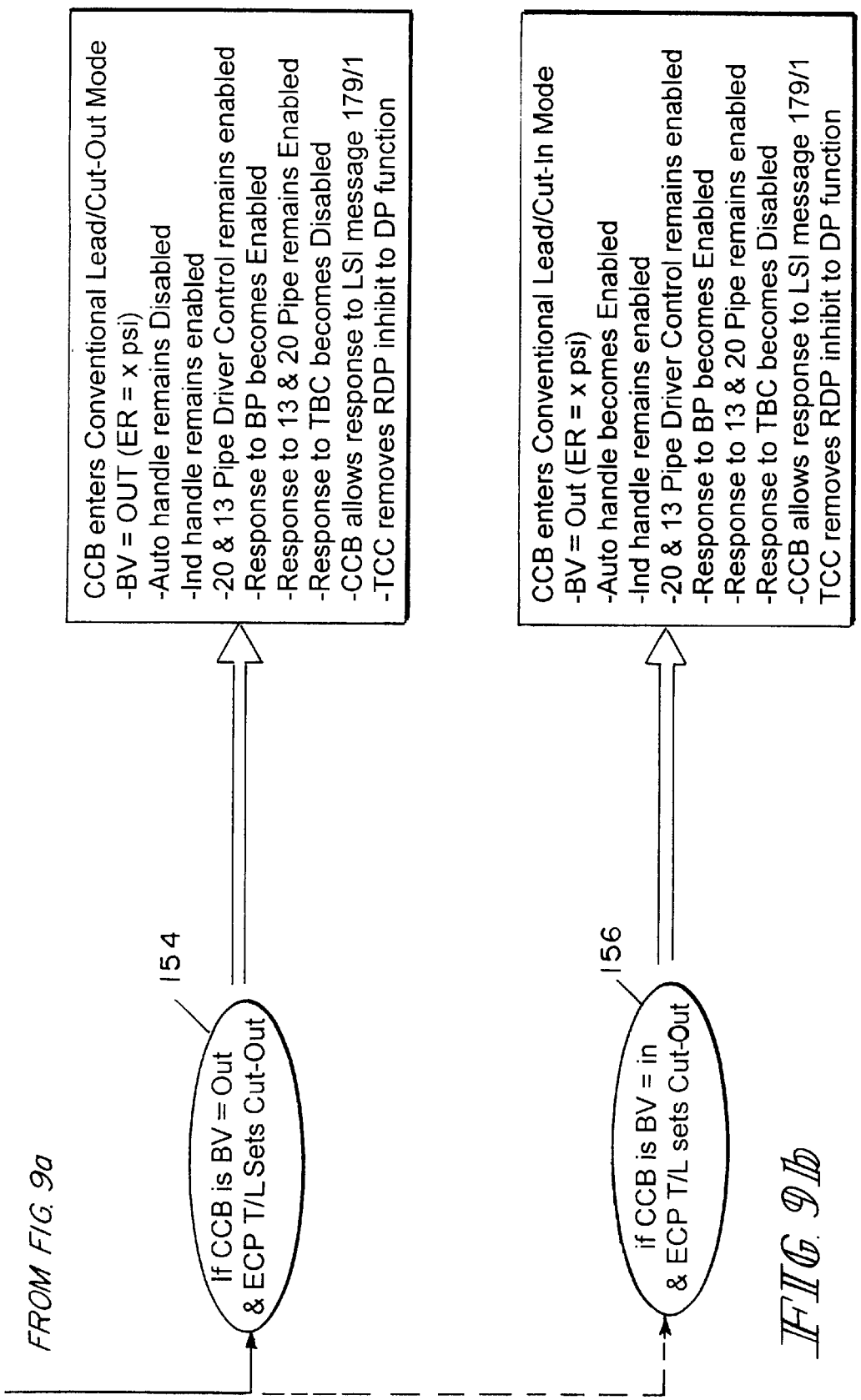

For the non-lead locomotives, the process is illustrated in FIGS. 9*a* and *b*. The preconditions are the CCB system is on and the trainline power supply 41 is on, as is the TCC 42. The wire distributed power WDP is set to inactive. The ECP electric mode is in trail or remote with the trainline active. The CCB pneumatic mode is in lead cut-in or cut-out and the speed is zero. The system allows non-lead locomotives to automatically transition from the EPC electric mode to the conventional pneumatic mode by identifying when the ECP trainline 40 is set to cut-out. This allows locomotives located within the train consist which are initially conditioned to ECP electrical mode trail to transition automatically to pneumatic mode when the ECP trainline 40 commands cut-out. This is also accomplished without the need of crew to manually set up the locomotive for conventional pneumatic operation. Likewise, when the locomotive is condition to ECP remote, the system will automatically transition to the conventional pneumatic lead/cut-out mode.

If the CCB pneumatic mode is switched from lead to trail at 150, the TCC 42 commands the CCB 10 to ECP electric mode trail. The brake valve is set to out and the equalizing reservoir is set to zero. The automatic and independent handles are disabled as are the 20 and 13 pipe driver control. Response to the brake pipe remains disabled except for emergency and the response at 13 and 20 pipe remains enabled. The response to the ECP trainline brake commands remains enabled.

When the ECP trainline 40 is set to cut-out at 152, the CCB 10 enters the pneumatic mode in trail. The brake valve is set to out and the equalizing reservoir is set to zero. The automatic independent handles remain disabled. Response to the brake pipe becomes enabled and the response to the 13 and 20 pipe remains enabled. The response to the ECP trainline brake commands becomes disabled. The TCC 42 removes the radio distributed power inhibit to the distributed power function.

If the CCB 10 is set to the brake valve out and the ECP trainline is set to cut-out at 154, the CCB 10 enters a pneumatic lead/cut-out mode. The brake valve is equal to out and the equalizing reservoir is set to specific pressure. The automatic handle remains disabled and the independent handle and the 20 and 13 pipe driver control remains enabled. The response to the brake pipe becomes enabled and the response to the 13 and 20 pipes remain enabled. The response to the ECP trainline brake commands become disabled. The TCC 42 removes the radio distributed power inhibit to the distributive power function.

If the CCB pneumatic mode is brake valve in, and the ECP trainline sets cut-out at 156, the CCB 10 enters conventional pneumatic lead/cut-in mode. The brake valve is set to out and the equalizing reservoir is set to the desired pressure. The automatic handle becomes enabled and the independent handle and the 13 and 20 pipe driver controls remain enabled. The response to the brake pipe becomes enabled and the response to the 13 and 20 pipe remains enabled. A response to the ECP trainline brake commands become disabled. The TCC 42 removes the radio distributed power inhibit to the distributed power function.

As can be seen, in an ECP train, the brake pipe is primarily an air supply and is not used for brake controls. In the present system, the brake pipe 21 is used as a back up to allow pneumatic operation of the train brakes as well as for operator and pneumatic system initiated emergencies. With future acceptance by the industry of ECP brakes, the train brake pipe 21 and the locomotive pipes 22 and 23 may serve no control functions. In an all ECP train, the independent locomotive brake pipe 22 and the actuating locomotive pipe 23 can be eliminated. All signals will be sent out over the ECP trainline 40. Thus, trainline braking signals will be addressed separately to cars and locomotives, and special locomotive braking signals will be addressed only to locomotives.

It should also be noted in the present system, even those which include the independent brake pipe 22 with or without the actuating pipe 23, that those locomotives which have ECP brakes preferably will receive their brake signal over the electric trainline 40. Those locomotives that do not have ECP brakes will receive the signals pneumatically over the independent or locomotive brake pipe 22. Those locomotives which are not adjacent to the lead locomotive and not connected to other locomotives by the independent brake pipe 22 will either receive their signals by radio 33 or the remote locomotive may have ECP capability and receive its signals on ECP trainline 40. It may then control other adjacent locomotives on its consist pneumatically if they are connected by an independent pipe 22.

Another example of a remote locomotive would be a helper locomotive which is attached at the end of the train when needed, to ascend a certain grade. These locomotives would be ECP equipped and would take their locomotive brake signals off the ECP trainline 40. These would include automatic commands. Independent and bail-off commands would be provided by the operator of the helper locomotive, as they are performed today.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of transitioning between pneumatic and electric modes of an integrated pneumatic/electro-pneumatic train brake system including a brake control having a common operator brake controller, the method comprising:

initially, the control applies the brakes in response to the operator brake controller in a present mode;

the control enables a next mode upon a request from an operator and applies the brakes in the next mode to at least a level of the applied brakes in the present mode;

once the control verifies that the next mode is set up and upon request from the operator, the brakes are released in the present mode only; and once the present mode brakes are released, the control and the brake system switch to the next mode.

2. The method according to claim 1, wherein the present mode is the pneumatic mode and the next mode is the electric mode; and the operator releases the pneumatic brakes by moving the brake controller to release which charges a brake pipe.

3. The method according to claim 2, including maintaining the brake pipe charged in the electric mode.

4. The method according to claim 2, when the brake system is switched to the electric mode, a full service interlock is set and the electro-pneumatic brakes are released by moving the brake controller to full service and subsequently to release.

5. The method according to claim 2, wherein the electric mode will not be enabled if a speed of the train is more than zero.

6. The method according to claim 2, wherein the electric mode will not be enabled if the brake control is not in lead in the pneumatic mode and in lead in the electric mode.

7. The method according to claim 6, wherein the control is initially in trail in the electric mode and is changed to lead.

8. The method according to claim 2, wherein the brake system includes at least one other brake control in a network with the brake control; and when the brake control is switched to the electric mode, the brake control activates the network and the other brake control monitors the network and switches itself to the electric mode upon detecting that the network is active.

9. The method according to claim 8, wherein if the other brake control is in trail in the pneumatic mode, the other brake control switches into trail in the electric mode and if in lead in pneumatic mode, the other brake control switches into remote in the electric mode.

10. The method according to claim 9, wherein if the other brake control is changed from lead to trail in the pneumatic mode, the other brake control switches into trail in the electric mode and if changed from trail to lead in pneumatic mode, the other brake control switches into remote in the electric mode.

11. The method according to claim 1, wherein the present mode is the electric mode and the next mode is the pneumatic mode; the brake control enables the pneumatic mode in response to a first electric mode cut-out request from the operator; and the brake control releases the electro-pneumatic brakes after verification that the pneumatic mode is set up and upon a second cut-out request from the operator.

12. The method according to claim 11, wherein the brake control does not release the electropneumatic brake if the second cut-out request occurs within a predetermined time period after the first cut-out request.

13. The method according to claim 11, wherein if a train speed is more than zero any time before the second cut-out request, the electro-pneumatic brakes are set to a full service interlock.

14. The method according to claim 11, wherein the pneumatic mode will not be enabled if the brake control is not in lead in the pneumatic mode.

15. The method according to claim 11, wherein the brake control is changed to trail in the electric mode after the brake control has been switched to the pneumatic mode.

16. The method according to claim 11, wherein the brake system includes at least one other brake control in a network with the brake control; and when the brake control is switched to the pneumatic mode, the brake control sends a cut-out status on the network and the other brake control monitors the network and switches to the pneumatic mode upon detecting the cut-out status on the network.

17. The method according to claim 16, wherein the brake control is changed to trail in the electric mode after the brake control has been switched to the pneumatic mode and the network becomes inactive.

18. The method according to claim 16, wherein if the other brake control is in trail in the electric mode, the other brake control switches to trail in the pneumatic mode; and if in remote in the electric mode, the other brake control switches to lead/cut-out in the pneumatic mode.

19. A method of transitioning between pneumatic and electric modes of an integrated pneumatic/electro-pneumatic brake train brake system, the brake system includes a plurality of brake controls in a network, the method comprising:

switching one of the brake controls to an electric mode;

activating the network by the one brake control in the electric mode; and each of the other brake controls monitoring the network and switching themselves to the electric mode upon determining that the network is activated.

20. The method of claim 19, wherein the one brake control is set to lead prior to switching to the electric mode and the other brake controls set themselves to non-lead upon determining that the network is activated.

21. The method according to claim 19, wherein if the other brake controls are in trail in the pneumatic mode, the other brake controls switch into trail in the electric mode and if in lead in pneumatic mode, the other brake controls switch into remote in the electric mode.

22. The method according to claim 21, wherein if the other brake controls are changed from lead to trail in the pneumatic mode, the other brake controls switch into trail in the electric mode and if changed from trail to lead in pneumatic mode, the other brake controls switch into remote in the electric mode.

23. The method according to claim 19, wherein when the one brake control is switched to the pneumatic mode, the brake control sends a cut-out status on the network and the other brake controls monitor the network and switch to the pneumatic mode upon detecting the cut-out status on the network.

24. The method according to claim 19, wherein the one brake control is changed to trail in the electric mode after the one brake control has been switched to the pneumatic mode and the network becomes inactive.

25. The method according to claim 19, wherein if the other brake controls are in trail in the electric mode, the other brake controls switch to trail in the pneumatic mode; and if in remote in the electric mode, the other brake controls switch to lead/cut-out in the pneumatic mode.

26. A method of transitioning from a pneumatic mode to an electric mode of an integrated pneumatic/electro-pneumatic train brake system including a brake control having a common operator brake controller, the method comprising:

initially, the control applies the brakes in response to the operator brake controller in the pneumatic mode the control enables the electric mode upon a request from an operator and applies the brakes in the electric mode to at least the value of the applied brakes in the pneumatic mode;

once the control verifies that the electric mode is set up, the operator using the brake controller releases the brakes in the pneumatic mode only; and once the pneumatic mode brakes are released, the control and the brake system switch to the electric mode.

27. A method of transitioning from an electric mode to a pneumatic mode of an integrated pneumatic/electro-pneumatic train brake system including a brake control having a common operator brake controller, the method comprising:

initially, the control applies the brakes in response to the operator brake controller in the electric mode;

the control enables the pneumatic mode upon a first electric mode cut-out request from an operator and applies the brakes in the electric mode to at least the value of the applied brakes in the pneumatic mode;

the control releases the brakes in the electric mode only after verifying that the pneumatic mode is set up and upon receipt of a second cut-out request from the operator; and once the electric mode brakes are released, the control and the brake system switch to the pneumatic mode.

* * * * *